United States Patent
Meir

(10) Patent No.: US 9,535,611 B2
(45) Date of Patent: *Jan. 3, 2017

(54) CACHE MEMORY FOR HYBRID DISK DRIVES

(71) Applicant: Apple Inc., Cupertino, CA (US)

(72) Inventor: Avraham Meir, Rishon Le-Zion (IL)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/160,683

(22) Filed: May 20, 2016

(65) Prior Publication Data

US 2016/0266798 A1    Sep. 15, 2016

Related U.S. Application Data

(63) Continuation of application No. 14/797,292, filed on Jul. 13, 2015, now Pat. No. 9,372,804, which is a continuation of application No. 13/069,406, filed on Mar. 23, 2011, now Pat. No. 9,104,580.

(60) Provisional application No. 61/367,894, filed on Jul. 27, 2010.

(51) Int. Cl.
    *G06F 12/00* (2006.01)
    *G06F 3/06* (2006.01)
    *G06F 12/08* (2016.01)
    *G06F 12/02* (2006.01)
    *G06F 11/00* (2006.01)

(52) U.S. Cl.
    CPC ............ *G06F 3/061* (2013.01); *G06F 3/064* (2013.01); *G06F 3/0614* (2013.01); *G06F 3/0655* (2013.01); *G06F 3/0685* (2013.01); *G06F 3/0688* (2013.01); *G06F 11/00* (2013.01); *G06F 12/0246* (2013.01); *G06F 12/0806* (2013.01); *G06F 12/0871* (2013.01); *G06F 12/0893* (2013.01); *G06F 12/0848* (2013.01); *G06F 12/0864* (2013.01); *G06F 12/0866* (2013.01); *G06F 2212/222* (2013.01); *G06F 2212/621* (2013.01)

(58) Field of Classification Search
    CPC ........... G06F 12/00; G06F 12/02; G06F 12/08
    See application file for complete search history.

(56) References Cited

U.S. PATENT DOCUMENTS

| | | |
|---|---|---|
| 5,402,380 A | 3/1995 | Kumakura et al. |
| 5,930,167 A | 7/1999 | Lee et al. |
| 6,016,275 A | 1/2000 | Han |
| 8,375,187 B1 | 2/2013 | Chilton |
| 9,104,580 B1 | 8/2015 | Meir |
| 2004/0205296 A1 | 10/2004 | Bearden |
| 2005/0235124 A1 | 10/2005 | Pomaranski et al. |
| 2006/0249585 A1 | 11/2006 | Hammerschmitt et al. |
| 2007/0266276 A1 | 11/2007 | Gatzemeier et al. |
| 2008/0062761 A1 | 3/2008 | Tu |

(Continued)

*Primary Examiner* — Ryan Bertram
*Assistant Examiner* — Kenneth Tsang
(74) *Attorney, Agent, or Firm* — Meyertons, Hood, Kivlin, Kowert & Goetzel, P.C.

(57) ABSTRACT

A method for data storage in a data storage system, which includes a main storage device and a non-volatile memory, includes assessing quality levels of respective memory blocks of the non-volatile memory. One or more of the memory blocks whose assessed quality levels are lower than a predefined quality threshold are identified. The identified memory blocks are assigned to serve as read cache memory. Data is read from the main storage device via the read cache memory, including the assigned memory blocks.

21 Claims, 1 Drawing Sheet

(56) References Cited

U.S. PATENT DOCUMENTS

| | | |
|---|---|---|
| 2009/0161466 A1 | 6/2009 | Hamilton et al. |
| 2009/0193301 A1 | 7/2009 | Ito et al. |
| 2009/0204852 A1 | 8/2009 | Diggs et al. |
| 2009/0259896 A1 | 10/2009 | Hsu et al. |
| 2009/0319825 A1 | 12/2009 | Yang et al. |
| 2010/0027343 A1 | 2/2010 | Teggatz et al. |
| 2010/0115197 A1 | 5/2010 | Lee et al. |
| 2010/0165689 A1 | 7/2010 | Rotbard et al. |
| 2010/0306577 A1 | 12/2010 | Dreifus et al. |
| 2010/0306582 A1 | 12/2010 | Han et al. |
| 2011/0047437 A1 | 2/2011 | Flynn |
| 2011/0055397 A1 | 3/2011 | Dehaan |
| 2011/0099418 A1 | 4/2011 | Chen |
| 2011/0138106 A1 | 6/2011 | Prabhakaran et al. |
| 2011/0252289 A1 | 10/2011 | Patapoutian et al. |
| 2012/0096225 A1 | 4/2012 | Khawand et al. |
| 2012/0117304 A1 | 5/2012 | Worthington et al. |
| 2015/0324298 A1 | 11/2015 | Meir |

CACHE MEMORY FOR HYBRID DISK DRIVES

CROSS-REFERENCE TO RELATED APPLICATIONS

This application is a continuation of U.S. patent application Ser. No. 14/797,292, entitled "Cache Memory for Hybrid Disk Drives," filed Jul. 13, 2015, which is a continuation of U.S. patent application Ser. No. 13/069,406, entitled "Cache Memory for Hybrid Disk Drives," filed Mar. 23, 2011, which claims the benefit of U.S. Provisional Patent Application 61/367,894, filed Jul. 27, 2010, whose disclosure is incorporated herein by reference.

TECHNICAL FIELD

The present disclosure relates generally to data storage, and particularly to cache memories in data storage systems.

BACKGROUND

Cache memories are used in various data storage applications. For example, some disk drives use a hybrid configuration in which a Non-Volatile Memory (NVM—e.g., Flash memory) is used as cache memory for a Hard disk Drive (HDD). Hong and Shin, for example, describe such hybrid configurations, in "NAND Flash-based Disk Cache Using SLC/MLC Combined Flash Memory," 2010 International Workshop on Storage Network Architecture and Parallel I/Os, May, 2010, which is incorporated herein by reference.

BRIEF SUMMARY

An embodiment that is described herein provides a method for data storage in a data storage system that includes a main storage device and a non-volatile memory. The method includes assessing quality levels of respective memory blocks of the non-volatile memory. One or more of the memory blocks whose assessed quality levels are lower than a predefined quality threshold are identified. The identified memory blocks are assigned to serve as read cache memory. Data is read from the main storage device via the read cache memory, including the assigned memory blocks.

In some embodiments, the non-volatile memory is partitioned into at least the read cache memory and a write cache memory, and the method includes assigning at least one memory block whose assessed quality level is higher than the predefined quality threshold to the write cache memory. In a disclosed embodiment, assessing the quality levels includes assessing respective numbers of Programming and Erasure (P/E) cycles applied to the memory blocks, and identifying the memory blocks includes detecting the memory blocks whose numbers of P/E cycles are larger than a predefined number.

In another embodiment, assessing the quality levels includes extracting the quality levels from production test results that identify low-quality memory blocks. Extracting the quality levels may include identifying the memory blocks that are indicated by the test data as expected to endure less than a predefined number of P/E cycles.

In an embodiment, assessing the quality levels includes assessing respective programming times needed for programming the memory blocks, and identifying the memory blocks includes detecting the memory blocks whose programming times are smaller than a predefined time threshold. In another embodiment, assessing the quality levels includes assessing respective erasure times needed for erasing the memory blocks, and identifying the memory blocks includes detecting the memory blocks whose erasure times are longer than a predefined time threshold.

In yet another embodiment, assessing the quality levels includes assessing respective numbers of post-programming errors in the memory blocks, and identifying the memory blocks includes detecting the memory blocks whose numbers of post-programming errors are larger than a predefined number. Assessing the numbers of post-programming errors may include assessing a count of the post-programming errors in a given page belonging to a given memory block upon completing to program one or more subsequent pages in the given block. In still another embodiment, assessing the quality levels includes assessing respective numbers of errors in the memory blocks following a given retention period or temperature change, and identifying the memory blocks includes detecting the memory blocks whose numbers of errors are larger than a predefined number.

In some embodiments, the method includes storing the data in the memory blocks belonging to the read cache memory at a first storage density, and storing the data in the memory blocks that do not belong to the read cache memory at a second storage density that is smaller than the first storage density. The method may include setting the predefined threshold based on a criterion relating to a size of the read cache memory. In an embodiment, the main storage device includes a Hard Disk Drive (HDD) and the non-volatile memory includes a solid state memory device.

In another embodiment, assessing the quality levels includes reporting at least one of the assessed quality levels from a memory controller coupled to the non-volatile memory to a host, and assigning the identified memory blocks includes allocating the identified memory blocks to the read cache memory by the host based on the reported quality metrics, and indicating the memory blocks assigned to the read cache memory from the host to the memory controller.

There is additionally provided, in accordance with an embodiment, apparatus including an interface and a processor. The interface is configured to communicate at least with a non-volatile memory. The processor is configured to assess quality levels of respective memory blocks of the non-volatile memory, to identify one or more of the memory blocks whose assessed quality levels are lower than a predefined quality threshold, and to assign the identified memory blocks to serve as read cache memory for readout from a main storage device.

There is also provided, in accordance with an embodiment, a data storage apparatus including a main storage device, a non-volatile memory and a processor. The processor is configured to assess quality levels of respective memory blocks of the non-volatile memory, to identify one or more of the memory blocks whose assessed quality levels are lower than a predefined quality threshold, and to assign the identified memory blocks to serve as read cache memory for readout from the main storage device.

These and other embodiments will be more fully understood from the following detailed description of the embodiments thereof, taken together with the drawings in which:

DETAILED DESCRIPTION OF EMBODIMENTS

Overview

Embodiments that are described hereinbelow provide improved methods and devices for data caching in data storage systems. In some embodiments, a memory system comprises a main storage device, a non-volatile memory and a memory controller. The main storage device, such as a Hard Disk Drive (HDD), is used for long-term storage. The non-volatile memory comprises multiple memory blocks, at least some of which are used as a read cache memory for data items that are stored in the main storage device. The memory controller, amongst other tasks, selects which of the memory blocks of the non-volatile memory are to serve as the read cache memory.

In some disclosed embodiments, the memory controller identifies low-quality blocks and assigns them to the read cache memory. Low-quality memory blocks may comprise, for example, heavily-cycled memory blocks that have endured a high number of Programming and Erasure (P/E) cycles, or memory blocks that were identified as having low quality by a production screening process.

Since any data item that is cached in the read cache memory is also stored in the main storage device, failure to read a data item from the read cache memory would not cause data loss. Such a failure would only cause temporary delay because of the need to fetch the data item in question from the main storage device. Therefore, assigning low-quality blocks to serve as read cache memory causes little or no degradation in readout performance.

On the other hand, this sort of assignment provides considerable advantages. For example, some of the memory blocks assigned to the read cache memory may not be usable for other purposes because of their low quality, and would otherwise be wasted. Therefore, the disclosed techniques enable a more efficient use of the non-volatile memory. Moreover, when using the disclosed assignment schemes, memory blocks assigned to purposes other than read cache (e.g., write cache) typically have a higher quality, on average. As a result, system performance (e.g., write caching performance) is improved.

The disclosed techniques can be used, for example, in hybrid disk drives in which the main storage device comprises a HDD and the non-volatile memory comprises a solid state memory such as Flash. In alternative embodiments, the disclosed techniques can be used in Solid State Drives (SSD) in which both the main storage device and the non-volatile memory comprise solid state memory.

System Description

Figure 1:
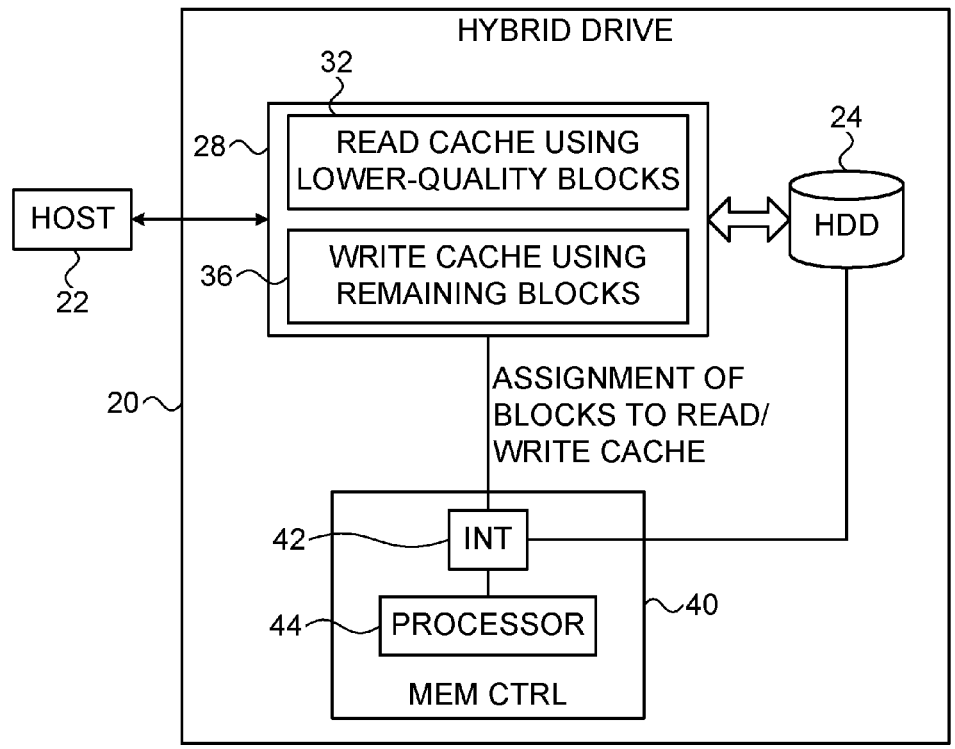
FIG. 1 is a block diagram that schematically illustrates a hybrid disk drive, in accordance with an embodiment.

FIG. 1 is a block diagram that schematically illustrates a hybrid disk drive 20, in accordance with an embodiment. Disk drive 20 stores data on behalf of a host 22. For example, drive 20 may be installed in a personal computer, in a mobile computing and/or communication device, in an enterprise data center or in any other suitable type of host system.

Hybrid drive 20 comprises a main storage device, in the present example a Hard Disk Drive (HDD) 24, which is used for long-term storage of data items that are accepted from host 22. In addition, drive 20 comprises a solid state Non-Volatile Memory (NVM) 28, in the present example one or more Flash memory devices. NVM 28 is used as a cache memory for temporary caching of data items that are read from and written to HDD 24.

The term "main storage device" typically refers to the largest memory that is used by the host for storage of data. In some embodiments the main storage device is used for long-term storage, as opposed to interim storage or buffering. Typically, the host stores and retrieves data items by specifying storage addresses for the data items in an address space of the main storage device. The term "cache memory" refers to a memory that is used for storage of frequently accessed data, in order to improve the storage and/or retrieval performance. The data stored in the cache memory may be stored in the main storage device as well.

The performance improvement is typically achieved by using cache memories having faster access time in comparison with the main storage device. For example, a read cache memory typically holds data items that have been retrieved in the past from the main storage device, so that if and when these data items are requested again, they can be read from the (faster) read cache memory instead of the (slower) main storage device. A write cache memory typically holds data items that are en-route from the host to the main storage device, for example frequently-written data items. A write cache memory increases storage speed, since write operations can be acknowledged once the data items are stored successfully in the write cache memory. Typically, the host is unaware of the storage addresses of cache memories.

Typically, NVM 28 comprises multiple memory blocks, and each memory block comprises multiple memory cells. The various memory blocks of NVM 28 may be assigned to serve different functions. In some embodiments, a certain subset of the memory blocks is assigned to serve as a read cache memory 32, and another subset of the memory blocks is assigned to serve as a write cache memory 36. Each of these subsets does not necessarily occupy contiguous memory addresses. Example criteria for assigning memory blocks to read cache memory 32 and write cache memory 36 is described below.

Drive 20 comprises a memory controller 40, which manages and controls the various elements of the hybrid drive. Memory controller 40 comprises an interface for communicating with HDD 24 and NVM 28, and a processor 44 that carries out the methods described herein. As will be explained in detail below, processor 44 of memory controller 40 selects and assigns memory blocks of NVM 28 to serve various functions, such as read cache memory 32 and write cache memory 36.

In a typical readout process, memory controller 40 of drive 20 is requested by host 22 to retrieve a certain data item that is stored in HDD 24. In response to the request, the memory controller first checks whether the requested data item is cached in read cache memory 32 (whose access time is typically much faster than that of HDD 24). If the data item is cached, the memory controller reads the data item from the read cache memory and sends it to the host without involving the HDD. Otherwise, the memory controller reads the data item from the HDD and sends it to the host. The memory controller may apply any suitable criteria as to whether to add, retain or discard data items in the read cache memory. Note, however, that any data item that is cached in read cache memory 32 is also stored in HDD 24.

In a typical writing process, memory controller 40 receives from host 22 a data item for storage in HDD 24. The memory controller initially caches the data item in write cache memory 36 (whose access time is typically much faster than that of HDD 24) and sends an acknowledgement to the host. At a later time, the memory controller may copy the data item from write cache memory 36 for long-term storage in HDD 24. The memory controller may apply any suitable criteria as to whether to add, retain or discard data items in the write cache memory.

In a typical hybrid drive, the capacity of HDD 24 is on the order of 500-1000 GB, the capacity of read cache memory 32 is on the order of ~12 GB, and the capacity of write cache memory 36 is on the order of ~4 GB. A typical memory block size in NVM 28 is on the order of ~2 MB. These values, however, are given purely by way of example, and any other suitable values may be used.

The configuration of hybrid drive 20 shown in FIG. 1 is an example configuration, which is chosen purely for the sake of conceptual clarity. Elements that are not necessary for understanding the principles of the various embodiments have been omitted from the figure for clarity. In alternative embodiments, any other suitable configuration can be used. For example, the main storage device may comprise any other suitable storage medium, such as a Flash-based Solid State Drive (SSD). In one embodiment, main storage device 24 and NVM 28 are implemented using the same memory media, for example by assigning certain address ranges in a SSD to serve as cache memories.

NVM 28 may comprise various other storage media, such as, for example, NAND, NOR or Charge Trap Flash (CTF) Flash memory, phase change RAM (PRAM, also referred to as Phase Change Memory—PCM), Nitride Read Only Memory (NROM), Ferroelectric RAM (FRAM), magnetic RAM (MRAM) and/or battery-backed Dynamic RAM (DRAM). In some embodiments the NVM comprises a read cache but not a write cache. NVM 28 may be used for various functions other than caching, such as for storing software code or system parameters.

In the example configuration of FIG. 1, memory controller 40 and NVM 28 are implemented as two separate Integrated Circuits (ICs). In alternative embodiments, however, the memory controller and NVM may be integrated on separate semiconductor dies in a single Multi-Chip Package (MCP) or System on Chip (SoC), and may be interconnected by an internal bus. Further alternatively, some or all of the memory controller circuitry may reside on the same die on which the NVM is disposed.

Further alternatively, some or all of the functionality of the memory controller can be implemented in software and carried out by a processor or other element of the host system, e.g., by host 22. In some embodiments, host 22 and memory controller 40 may be fabricated on the same die, or on separate dies in the same device package. In an example embodiment, memory controller 40 and NVM 28 are fabricated on a motherboard of the host system (e.g., mobile computer), separately from the HDD.

In some embodiments, memory controller 40 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory, or stored in NVM 28.

Assigning Lower-Quality Memory Blocks to Serve as Read Cache

In some embodiments, memory controller 40 assigns memory blocks in NVM 28 to read cache memory 32 based on the respective quality levels of the memory blocks. Typically, the memory controller identifies lower-quality blocks and assigns them to the read cache memory. The remaining memory blocks are assigned to other functions, such as to write cache memory 36.

This sort of assignment may increase the likelihood of failing to read data items from the read cache memory. Such failures, however, are usually tolerable, since any data item that is cached in read cache memory 32 is also stored in HDD 24. In the event that memory controller 40 fails to read a requested data item from the read cache memory, the memory controller reverts to read this data item from HDD 24 at the expense of a certain access time penalty.

On the other hand, assigning lower-quality memory blocks to the read cache memory improves the overall performance of drive 20. For example, some of the lower-quality memory blocks may not be usable for other purposes. If these memory blocks were not assigned to the read cache memory, they would have typically been declared bad blocks and discarded from use. Assigning such blocks to the read cache memory thus frees additional memory resources for other functions, e.g., for increasing the size of the write cache memory.

Furthermore, since the lower-quality memory blocks are assigned to the read cache memory, the memory blocks assigned to other functions (e.g., to the write cache memory) have, on average, a higher quality. As a result, system performance (e.g., write caching performance) is improved.

In the context of the present patent application and in the claims, the term "quality level" refers to any measure that is indicative of the expected storage quality of a given memory block. The quality level may be indicative, for example, of the expected storage reliability of the memory block, e.g., the expected likelihood of read errors in the block. Additionally or alternatively, the quality level may be indicative of the expected achievable storage capacity of the memory block, e.g., the number of bits or the number of bits/cell that can be stored in the memory cells of the memory block. In some types of NVM, the physical storage media of the memory cells deteriorate with use. Thus, in some embodiments the quality level of a memory block is indicative of the wear level of its physical storage media.

Memory controller 40 may assess the quality levels of the memory blocks of NVM 28 in various ways. In an example embodiment, the memory controller tracks or estimates the number of Programming and Erasure (P/E) cycles applied to each memory block. These numbers are indicative of the extent to which the memory blocks were used, and are therefore used by the memory controller as quality levels of the memory blocks.

In another embodiment, memory controller 40 has access to test data, e.g., production screening test data, of NVM 28. The test results typically indicate respective test results for each memory block. The memory controller extracts the quality level of each memory block from the test data. In one example embodiment, the test data indicate memory blocks that were found during production testing to have low expected endurance (e.g., memory blocks that are expected to endure less than a certain number of P/E cycles). The memory controller may use these indications as quality levels.

In yet another embodiment, memory controller 40 assesses the time needed to program the memory cells in the various memory blocks. For example, when the memory cells are programmed using an iterative Programming and Verification (P&V) process, the memory controller may assess the average number of P&V iterations needed for programming the various blocks. Typically, lower-quality memory cells are characterized by shorter programming times, and vice versa. In this embodiment, the memory controller regards the programming times of the various memory blocks as quality levels. Memory blocks exhibiting relatively short programming times (e.g., times shorter than a predefined threshold value) are regarded by the controller as low-quality blocks.

In still another embodiment, memory controller 40 assesses the time needed to erase the various memory blocks. Typically, lower-quality memory cells are characterized by longer erasure time, and vice versa. In this embodiment, the memory controller regards the erasure times of the various memory blocks as quality levels. Memory blocks exhibiting relatively long erasure times (e.g., times longer than a predefined threshold value) are regarded by the controller as low-quality blocks.

As yet another example, memory controller 40 may assess the number of post-programming errors in the various memory blocks. For example, the memory controller may read one or more pages from a given block shortly after programming (or use the read results of the last verification operation), and count the number of read errors in these pages. In this embodiment, the memory controller regards the number of post-programming errors in the various memory blocks as quality levels. Memory blocks exhibiting relatively large numbers of post-programming errors (e.g., numbers that exceed a predefined threshold value) are regarded by the controller as low-quality blocks.

In some embodiments, the memory controller assesses the number of post-programming errors in a given page upon completing to program this page, and before programming subsequent pages. Alternatively, however, the memory controller may assess the number of post-programming errors in a given page upon completing to program one or more subsequent pages in the same block (e.g., upon completing to program the entire word line to which the page belongs, the next word line, or the entire block to which the page belongs). These delayed assessment times enable the memory controller to observe impairments (e.g., program disturb) caused to the page by subsequent programming of the block.

In another alternative embodiment, the memory controller assesses the number of errors in the various memory blocks following a certain retention time and/or temperature change. These error counts are regarded as quality levels. Memory blocks that accumulate a large number of errors (e.g., larger than a predefined threshold value) during a certain retention period and/or over a certain temperature change are regarded as low-quality blocks. Additionally or alternatively, memory controller 40 may assess the quality levels of the memory cells using any other suitable method or criterion.

Typically, the memory controller compares the assessed quality levels of the memory blocks to some predefined quality threshold. Memory blocks whose quality level is lower than the threshold are classified as having low quality and assigned to the read cache memory. Memory blocks whose quality level exceeds the threshold are classified as having high quality and assigned to other functions, e.g., to the write cache memory.

The memory controller may set the quality threshold at various levels, and may modify the quality threshold over time. By setting the quality threshold, the memory controller is able to control the size of read cache memory 32, and to apply various trade-offs between this size and the sizes of other memory allocations, e.g., the size of write cache memory 36. In general, the memory controller may set the quality threshold based on any suitable criterion relating to the size of the read cache memory.

For example, the memory controller may decide that the capacity of NVM 28 is to be divided at a certain ratio between read cache memory 32 and write cache memory 36 (e.g., a 1:1 ratio or any other suitable ratio). The memory controller can derive the quality threshold that would achieve the desired ratio. As another example, the memory controller may decide that the size of read cache memory 32 should be of a certain size, and set the quality level so as to reach this size. In other words, the memory controller may set the quality threshold such that a certain desired percentage of the memory blocks, or a certain desired number of memory blocks, will fall below the threshold and will be regarded as low-quality memory blocks.

In some embodiments, memory controller 40 stores data in read cache memory 32 at a higher density than the density used for other functions of NVM 28. Higher density typically corresponds to higher error probability, but the increase in error probability is usually tolerable in the read cache memory, as explained above. In some embodiments, the memory controller stores data in the memory blocks of the read cache memory using a certain number of programming states (certain number of bits/cell), and in the other memory blocks using a smaller number of programming sates (fewer bits/cell).

Cache Configuration Method Description

Figure 2:
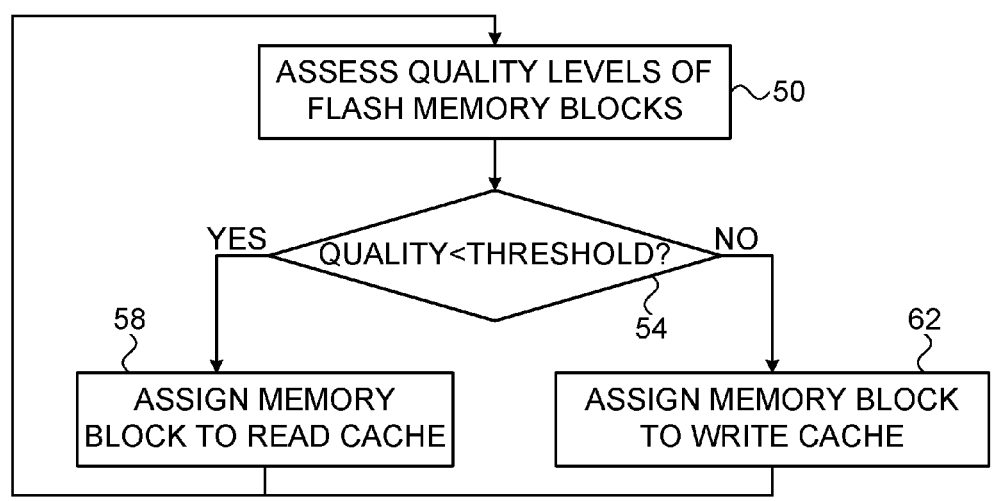
FIG. 2 is a flow chart that schematically illustrates a method for configuring read and write cache memory in a hybrid disk drive, in accordance with an embodiment.

FIG. 2 is a flow chart that schematically illustrates a method for configuring read cache memory 32 and write cache memory 36 in hybrid disk drive 20, in accordance with an embodiment. The method begins with memory controller 40 assessing the quality levels of memory blocks in NVM 28, at a quality assessment step 50. The memory controller compares the assessed quality levels to a quality threshold, at a comparison step 54. Memory blocks whose assessed quality levels are below the quality threshold are assigned by memory controller 40 to read cache memory 32, at a read cache assignment step 58. Memory blocks whose assessed quality levels meet or exceed the quality threshold are assigned by the memory controller to write cache memory 36, at a write cache assignment step 62. In subsequent read operations, the memory controller uses the read cache memory including the assigned memory blocks.

The method then loops back to step 50 above. The memory controller may run this block assignment process continually, periodically or in response to some event, e.g., when modifying the quality threshold or in order to account for changes in block quality levels that occur over time.

As noted above, some or all of the functionality of memory controller 40 may be implemented in host 22. In one example embodiment, the memory controller reports to the host which memory blocks of NVM 28 have low quality levels, e.g., over a suitable host interface. The host selects and assigns memory blocks to read cache memory 32 based on the reported quality levels.

It will thus be appreciated that the embodiments described above are cited by way of example, and are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

What is claimed is:

1. An apparatus, comprising:
a non-volatile memory including a plurality of memory blocks, wherein each memory block of the plurality of memory blocks includes a plurality of memory cells;
an interface circuit configured to communicate with the non-volatile memory; and
a processor configured to:
determine a quality level of a given memory block of the plurality of memory blocks dependent upon a time required to complete an operation on at least one memory cell of the plurality of memory cells included in the given memory block; and
assign the given memory block to serve as a portion of a read cache memory in response to a determination that the quality level of the given memory block is less than a predetermined quality threshold and to otherwise assign the given memory block as a portion of a write cache memory.

2. The apparatus of claim 1, wherein the processor is further configured to assign the given memory block to serve as a portion of a write cache memory in response to a determination that the quality level of the given memory block is greater than or equal to the predetermined quality threshold.

3. The apparatus of claim 1, wherein the operation includes an erase operation.

4. The apparatus of claim 1, wherein the operation includes a programming operation.

5. The apparatus of claim 1, wherein the processor is further configured to determine the quality level of the given memory block in response to a change in temperature.

6. The apparatus of claim 1, wherein the processor is further configured to determine the quality level of the given memory block in response to a determination that a retention time has elapsed.

7. A method, comprising:
determining a quality level of a given memory block included in a plurality of memory blocks dependent upon a time required to complete an operation on at least one memory cell of a plurality of memory cells included in the given memory block; and
determining whether to assign the given memory block to serve as a portion of a write cache memory based on a determination that the quality level of the given memory block meets a predetermined quality threshold, or to otherwise assign the given memory block to a portion of a read cache memory.

8. The method of claim 7, further comprising assigning the given memory block to serve as a portion of a read cache memory in response to a determination that the quality level of the given memory block is less than the predetermined quality threshold.

9. The method of claim 7, further comprising assign the given memory block to serve as a portion of a write cache memory in response to a determination that the quality level of the given memory block is greater than or equal to the predetermined quality threshold.

10. The method of claim 7, wherein the operation includes an erase operation.

11. The method of claim 7, wherein the operation includes a programming operation.

12. The method of claim 7, further comprising determining the quality level of the given memory block in response to a change in temperature.

13. The method of claim 7, further comprising determining the quality level of the given memory block in response determining that a retention time has elapsed.

14. The method of claim 7, wherein the predetermined quality threshold is dependent upon a size of the read cache memory.

15. A system, comprising:
a main storage device;
a non-volatile memory, wherein the non-volatile memory includes a plurality of memory blocks, and wherein each memory block of the plurality of memory blocks includes a plurality of memory cells; and
a memory controller, configured to:
determine a quality level of a given memory block of the plurality of memory blocks dependent upon a time required to complete an operation on at least one memory cell of the plurality of memory cells included in given memory block; and
assign the given memory block to serve as a portion of a read cache memory in response to a determination that the quality level of the given memory block is less than a predetermined quality threshold and to otherwise assign the given memory block as a portion of a write cache memory.

16. The system of claim 15, wherein the memory controller is further configured to assign the given memory block to serve as a portion of a write cache memory in response to a determination that the quality level of the given memory block is greater than or equal to the predetermined quality threshold.

17. The system of claim 15, wherein the operation includes an erase operation.

18. The system of claim 15, wherein the operation includes a programming operation.

19. The system of claim 15, wherein the memory controller is further configured to determine the quality level of the given memory block in response to a change in temperature.

20. The system of claim 15, wherein the memory controller is further configured to determine the quality level of the given memory block in response to a determination that a retention time has elapsed.

21. The system of claim 15, wherein the predetermined quality threshold is dependent upon a size of the read cache memory.

* * * * *